US008738783B2

(12) United States Patent
Bathiche et al.

(10) Patent No.: US 8,738,783 B2
(45) Date of Patent: May 27, 2014

(54) SYSTEM FOR INTERACTION OF PAIRED DEVICES

(75) Inventors: Steven N. Bathiche, Kirkland, WA (US); Jason Alexander Meistrich, Seattle, WA (US); Kenneth Hinckley, Kirkland, WA (US); Karon A. Weber, Kirkland, WA (US); Anthony Cox, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 200 days.

(21) Appl. No.: 12/820,982

(22) Filed: Jun. 22, 2010

(65) Prior Publication Data

US 2011/0314168 A1 Dec. 22, 2011

(51) Int. Cl.
*G06F 15/16* (2006.01)

(52) U.S. Cl.
USPC ............................ 709/228; 709/229; 370/338

(58) Field of Classification Search
USPC .................................. 709/228, 229; 370/338
See application file for complete search history.

(56) References Cited

U.S. PATENT DOCUMENTS

| | | | |
|---|---|---|---|
| 5,950,341 A * | 9/1999 | Cross .............................. 40/750 |
| 7,177,911 B2 | 2/2007 | deCarmo |
| 7,821,780 B2 * | 10/2010 | Choy ....................... 361/679.06 |
| 7,925,022 B2 | 4/2011 | Jung et al. |
| 8,260,883 B2 | 9/2012 | Mooring et al. |
| 8,333,652 B2 | 12/2012 | Nguyen et al. |
| 2003/0162556 A1 | 8/2003 | Libes |
| 2004/0022250 A1 * | 2/2004 | Chen et al. ............... 370/395.43 |
| 2004/0139206 A1 * | 7/2004 | Claudatos et al. ............ 709/229 |
| 2005/0093868 A1 | 5/2005 | Hinckley |
| 2005/0228891 A1 * | 10/2005 | Itoh et al. ...................... 709/228 |
| 2006/0023674 A1 * | 2/2006 | Goring et al. ................. 370/338 |
| 2006/0267860 A1 | 11/2006 | Rinaldo et al. |
| 2006/0294247 A1 | 12/2006 | Hinckley et al. |
| 2007/0146347 A1 | 6/2007 | Rosenberg |
| 2007/0188323 A1 | 8/2007 | Sinclair et al. |
| 2007/0223476 A1 | 9/2007 | Fry |
| 2008/0046020 A1 * | 2/2008 | Peterson et al. ................ 607/30 |
| 2008/0170776 A1 | 7/2008 | Albertson et al. |
| 2008/0240440 A1 | 10/2008 | Rose et al. |
| 2009/0111378 A1 | 4/2009 | Sheynman et al. |

(Continued)

OTHER PUBLICATIONS

Yoo, "Cocktail: Exploiting Bartenders' Gestures for Mobile Interaction", Proceedings of MobileHCI (Mobile Human Computer Interaction), Sep. 15-18, 2009, 4 pages, Bonn, Germany, ACM, New York, NY, USA.

(Continued)

*Primary Examiner* — Quang N Nguyen
*Assistant Examiner* — Tesfay Yohannes
(74) *Attorney, Agent, or Firm* — Micah Goldsmith; Leonard Smith; Micky Minhas

(57) ABSTRACT

A system and method are disclosed for setting interactions between paired computing devices. Paired devices may interact in a master-slave relationship, where the slave device is an intelligent computing device capable of performing a wide variety of functions for the master computing device. When initiating a paired relationship, various characteristics relating to the initiating device are recorded, and the used in defining the relationship between the initiating device and the target device with which the initiating device paired. In a further example of interactions between paired computing devices, user-defined policies may be recorded, stored and implemented which affect the behavior of one or both computing devices when the two devices are paired.

14 Claims, 7 Drawing Sheets

(56) References Cited

U.S. PATENT DOCUMENTS

| | | | |
|---|---|---|---|
| 2009/0122243 A1* | 5/2009 | Sugiyama et al. | 349/118 |
| 2009/0197635 A1 | 8/2009 | Kim et al. | |
| 2009/0212966 A1* | 8/2009 | Panduro | 340/825.22 |
| 2009/0240814 A1 | 9/2009 | Brubacher et al. | |
| 2009/0265470 A1 | 10/2009 | Shen et al. | |
| 2009/0313032 A1* | 12/2009 | Hafner et al. | 705/1 |
| 2010/0013762 A1 | 1/2010 | Zontrop et al. | |
| 2010/0030907 A1* | 2/2010 | Pollak | 709/229 |
| 2010/0040293 A1 | 2/2010 | Hermann et al. | |
| 2010/0064228 A1 | 3/2010 | Tsern | |
| 2010/0073287 A1 | 3/2010 | Park et al. | |
| 2011/0125742 A1* | 5/2011 | Haines et al. | 707/736 |
| 2011/0126009 A1 | 5/2011 | Camp et al. | |
| 2011/0210820 A1 | 9/2011 | Talty et al. | |
| 2011/0296508 A1 | 12/2011 | Os et al. | |

OTHER PUBLICATIONS

U.S. Appl. No. 12/820,981, filed Jun. 22, 2010.

Office Action dated May 7, 2012 in U.S. Appl. No. 12/820,981.

International Search Report and Written Opinion dated Apr. 6, 2012 in International Patent Application No. PCT/US2011/039885.

Office Action dated Jan. 31, 2013 in U.S. Appl. No. 12/820,981.

Reponse to Office Action dated Oct. 30, 2012 in U.S. Appl. No. 12/820,981.

First Office Action dated May 17, 2013 in Chinese Patent Application No. 201110184689.4.

Response to Office Action filed Jul. 23, 2013 in U.S. Appl. No. 12/820,981.

Final Office Action dated Sep. 11, 2013 in U.S. Appl. No. 12/820,981.

Response to First Office Action filed Sep. 26, 2013 in Chinese Patent Application No. 201110184689.4.

English language Summary, and claims as amended in, Response to First Office Action filed Sep. 26, 2013 in Chinese Patent Application No. 201110184689.4.

Response to Office Action filed Mar. 10, 2014 in U.S. Appl. No. 12/820,981.

* cited by examiner

SYSTEM FOR INTERACTION OF PAIRED DEVICES

BACKGROUND

The current trend in computing is away from mainframe systems toward cloud computing. Cloud computing is Internet-based computing, whereby shared resources such as software and other information are provided to a variety of computing devices on-demand via the Internet. It represents a new consumption and delivery model for IT services where resources are available to all network-capable devices, as opposed to older models where resources were stored locally across the devices. Cloud computing typically involves the provision of dynamically scalable and often virtualized resources as a service over the Internet. It is a by-product and consequence of the ease-of-access to remote computing sites provided by the Internet. The move toward cloud computing opens up a new potential for mobile and other networked devices to work in conjunction with each other to provide greater interaction and a much richer experience with respect to third party and a user's own resources.

It is known to pair computing devices together, for example via a direct peer-to-peer connection, where one device then has access to the resources of the second device. With the transfer of resources to the cloud, computing devices are largely freed traditionally defined rolls. As such, there are opportunities pair different computing devices in new ways to enhance the user experience.

SUMMARY

Disclosed herein are systems and methods for setting interactions between paired computing devices. Computing devices may be paired by a variety of methods, including performance of a pairing initiation act such as bumping a first, initiating computing device against a second, target computing device. The pairing initiation act may be performed in a certain manner and/or accompanied by one or more gestures. These manners and gestures are referred to herein as parameterization descriptors, and are used to set one or more parameters relating to the pairing.

In one embodiment, paired devices may interact in a master-slave relationship, where the slave device is an intelligent computing device capable of performing a wide variety of functions for the master computing device. In one example, the parameterization descriptors may be used to set which computing device is to function as the slave and which as the master. A slave device may perform a variety of functions for the master, including for example to act as at least one of a display, a game controller, an input device, a storage device and a computational device for the master computing device.

In further embodiments, pairing between computing devices may occur automatically. Such embodiments may be useful in implementing an interaction between paired devices where predefined policies are implemented when two devices automatically pair. The defined policies may be created by a user to affect the behavior of one or more of his or her computing devices when they are paired.

An example of the present technology relates to a method of a first computing device interacting with a second computing device. The method includes the steps of: a) receiving an indication that a user desires to pair the first computing device with the second computing device; and b) pairing the first and second computing devices, with the first computing device operating as peripheral device for the second computing device, where the functionality of the first computing device as a peripheral device are determined by factors including at least one of: b1) parameters set by a user upon pairing the first computing device with the second computing device, b2) specifications of the characteristics and capabilities of the first computing device, and b3) an application running on the second computing device upon receipt of the indication in said step a).

Another example of the present technology relates to a method of a first computing device interacting with a second computing device, including the steps of: a) receiving an indication of a pairing initiation act between the first computing device and the second computing device; b) receiving an indication of one or more parameterization descriptors in conjunction with receiving the indication of said step a), the indication of the one or more parameterization descriptors indicating one or more parameters to be set for the pairing of the first and second computing devices; c) pairing the first and second computing devices together; and d) applying to the pairing one or more of the parameters indicated by the one or more parameterization descriptors of said step b).

A further example of the present technology relates to a method of a first computing device interacting with a second computing device, including the steps of: a) automatically pairing a first computing device with a second computing device upon the first and second devices being within communications range of each other; b) determining if a predefined policy exists relating to the first and second computing devices to be implemented upon pairing of the first and second computing devices, the predefined policy affecting a behavior of at least one of the first and second computing devices upon pairing of the first and second computing devices; and c) implementing the policy relating to the first and second computing devices if the policy is determined to exist in said step b).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Embodiments of the present technology will now be described with reference to FIGS. 1-7, which in general relate to a system for setting interactions between paired computing devices. In one embodiment, paired devices may interact in a master-slave relationship, where the slave device is an intelligent computing device capable of performing a wide variety of functions for the master computing device. When initiating a paired relationship, various characteristics relating to the initiating device are recorded, and then used in defining the relationship between the initiating device and the target device with which the initiating device is paired.

In embodiments explained below, a user may perform certain affirmative acts to pair an initiating device with a target device. In one example, the pairing of two proximate computing devices may be initiated by "bumping" technology, where the tapping or bumping of one device against another initiates the pairing process between the two devices.

In further embodiments, pairing between initiating and target devices may occur automatically. Such embodiments may be useful in implementing an interaction between paired devices where predefined policies are implemented when two devices automatically pair. These embodiments are explained in greater detail below.

Figure 1:
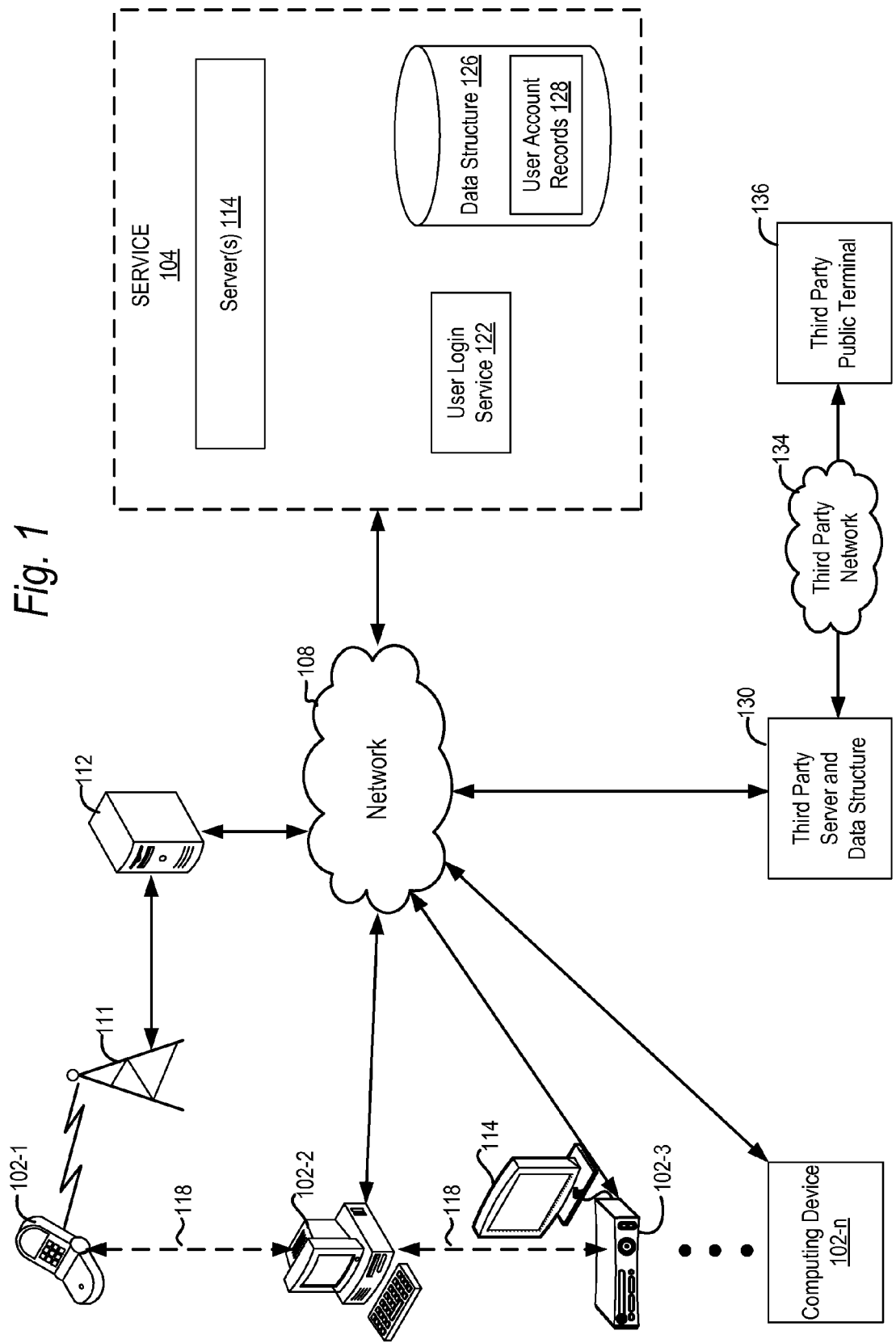
FIG. 1 a block diagram of a network topology for implementing the present technology.

FIG. 1 shows a block diagram of a sample network topology 100 for implementing the present technology. Network topology 100 includes a plurality of computing devices 102-1, 102-2, 102-3, . . . , 102-n capable of connecting to a service 104 via a network 108. In one example, computing device 102-1 may be a mobile telephone of a mobile telephone network. The mobile network may include base stations 111 (one of which is shown) for forwarding data and software from mobile telephone 102-1 to a mobile network backbone 112. Backbone 112 may in turn have a network connection to network 108. Computing device 102-2 may be a desktop computer, laptop computer or tablet, and computing device 102-3 may be a set-top box or game console having an associated display 114. The computing devices 102-2 and 102-3 may also be connected to service 104 via network 108. Further details relating to these computing devices is set forth below with respect to FIGS. 10 and 11.

The computing devices 102-1, 102-2 and 102-3 (referred to at times below simply as computing devices 102) shown in FIG. 1 are by way of example only and one or more of these may be omitted in further embodiments. The remaining computing devices 102 may be additional replicas of computing devices 102-1, 102-2 and 102-3 and/or other computing devices. In general, computing devices may include, but are not limited to desktop computers, laptop computers, tablets, cellular telephones, television/set top boxes, video game consoles, automobiles, cameras and smart appliances. Other computing devices are contemplated. It is understood that the network topology 100 may include only two devices 102 for pairing with each other. Any device 102 may be paired with any other device 102 as explained below.

The service 104 may for example be an enterprise service provider, though it need not be in further embodiments. Service 104 may include one or more servers 120, which may for example include a web server, a game server supporting gaming applications, a media server for organizing and distributing selected media, or an ftp server supporting file transfer and/or other types of servers.

In embodiments, the network 108 may comprise the Internet, though other networks including, but not limited to, a LAN or WAN are contemplated. Computing devices 102 may be connected to each other by peer-to-peer connections 118 in addition to, or instead of, their connection to network 108, as indicated by dashed lines 118. Although only some connections 118 are shown, each computing device 102 may be connected to each other computing device 102 via a peer-to-peer connection 118.

The service 104 also provides a collection of services which applications running on computing devices 102 may invoke and utilize. For example, computing devices 102 may invoke user login service 122, which is used to authenticate a user seeking secure resources from service 104, either directly or through a paired computing device. As explained below, a user may authenticate him or herself to the service 104 by a variety of authentication protocols, generally including some ownership indicia in the form of a user or computing device ID, and personal verification indicia in the form of some authentication token. Authentication of an initiating computing device seeking to initiate a pairing with a target computing device may alternatively be performed by the target device in further embodiments. Authentication protocols for the initiating device and target device may be omitted in further embodiments.

Where authentication is performed by the service 104, the ownership indicia for users and/or devices and the personal verification indicia for users may be stored in user account records 124 within a data structure 126. Data structure 126 may further include a variety of other data, including user profiles, user contacts, friends lists, etc. While servers 120, login service 122 and data structure 128 are shown as part of a single service 104, some or all of these components may be distributed across different services in further embodiments.

FIG. 1 further shows a third party server and data structure 130 connected to a third party public terminal 136 via a third party network connection 134. Connection 134 may be any of a variety of network connections, including for example the Internet, LAN or WAN and may be the same network as network 108. Public terminal 136 may be a computing device with specific and limited capabilities, such as for example an ATM, airline or other ticketing kiosk, internet kiosk, photo kiosk and a variety of other public terminals. Some or all of third party server 130 may be behind a firewall. The above description relates to one embodiment of a network topology 100. Other topologies 100 are contemplated.

Figure 2:
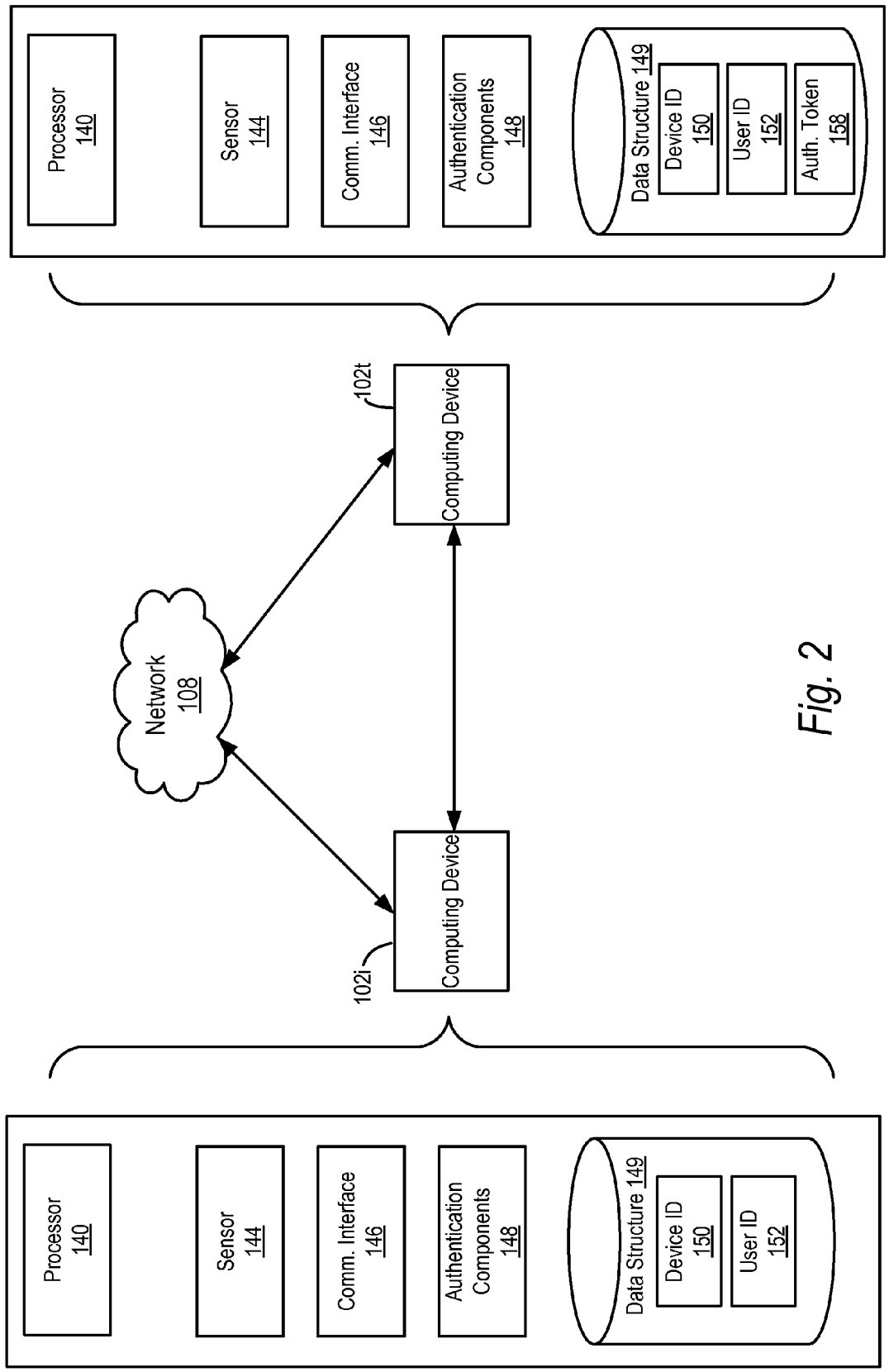
FIG. 2 is a block diagram of an initiating device pairing with a target device.

Pairing of devices in accordance with the present system may be between two or more computing devices owned by a single person, between two or more computing devices owned by different people and between a user device and a network accessed via a public terminal 136. Other pairings are contemplated. FIG. 2 shows an initiating computing device 102 initiating a pairing with a target computing device 102. The initiating computing device is referred to below as initiating device 102*i*, and the target computing device is referred to below as target device 102*t*. The embodiment of FIG. 2 including devices 102*i* and 102*t* covers the pairing of devices owned by a single person, or devices owned by different people. It is understood that the public terminal 136 may be used as a target device 102*t* in any of the described embodiments that follow.

Initiating device 102*i* may indicate a desire to pair with a target device 102*t* in a variety of ways. The initiating device may be bumped against the target device; the initiating device may be moved in some manner when in the proximity of the target device; and the initiating device may simply be positioned within a predefined range of the target device. This latter embodiment may be used for automatic pairing of computing devices as explained below. Given the movement of initiating device 102*i* in some embodiments, initiating device 102*i* may be a mobile telephone, tablet or other mobile computing device 102. In further embodiments, the initiating device 102*i* remains stationary and the target device 102*t* is moved into proximity with the initiating device 102*i*. In a further embodiment, both the initiating and target devices may be stationary. In any of the above embodiments, it is understood that the initiating device 102*i* may be any of the above-described computing devices 102, and the target device 102*t* may be any of the above-described computing devices 102.

As indicated, the initiating and target devices may be proximate to each other when they are paired. Proximate may mean close enough so that the initiating device 102*i* can bump against the target device 102*t*, or proximate can mean within the same personal area network. In further embodiments, devices may be separated some predefined distance greater than the limits of a personal area network and still be proximate to each other, for example where both the initiating and target devices are within a defined area (such as a home, office, airport, mall, etc.). While typical embodiments will pair devices that are proximate to each other, it is understood that certain embodiments described below may operate to pair devices together that are not proximate to each other.

In embodiments of the present technology, a user may perform some pairing initiation act with the initiating device so as to indicate the user's intent to pair with a target device. One example of a pairing initiation act is the bumping of an initiating device 102*i* against a target device 102*t*. Such an embodiment is described below with respect to FIGS. 2 and 3. The pairing initiation act may be variety of other actions where the initiating and target devices do not come into contact. In this latter embodiment, the initiating device user may or may not be aware of whether a potential target device 102*t* is within range.

Figure 3:
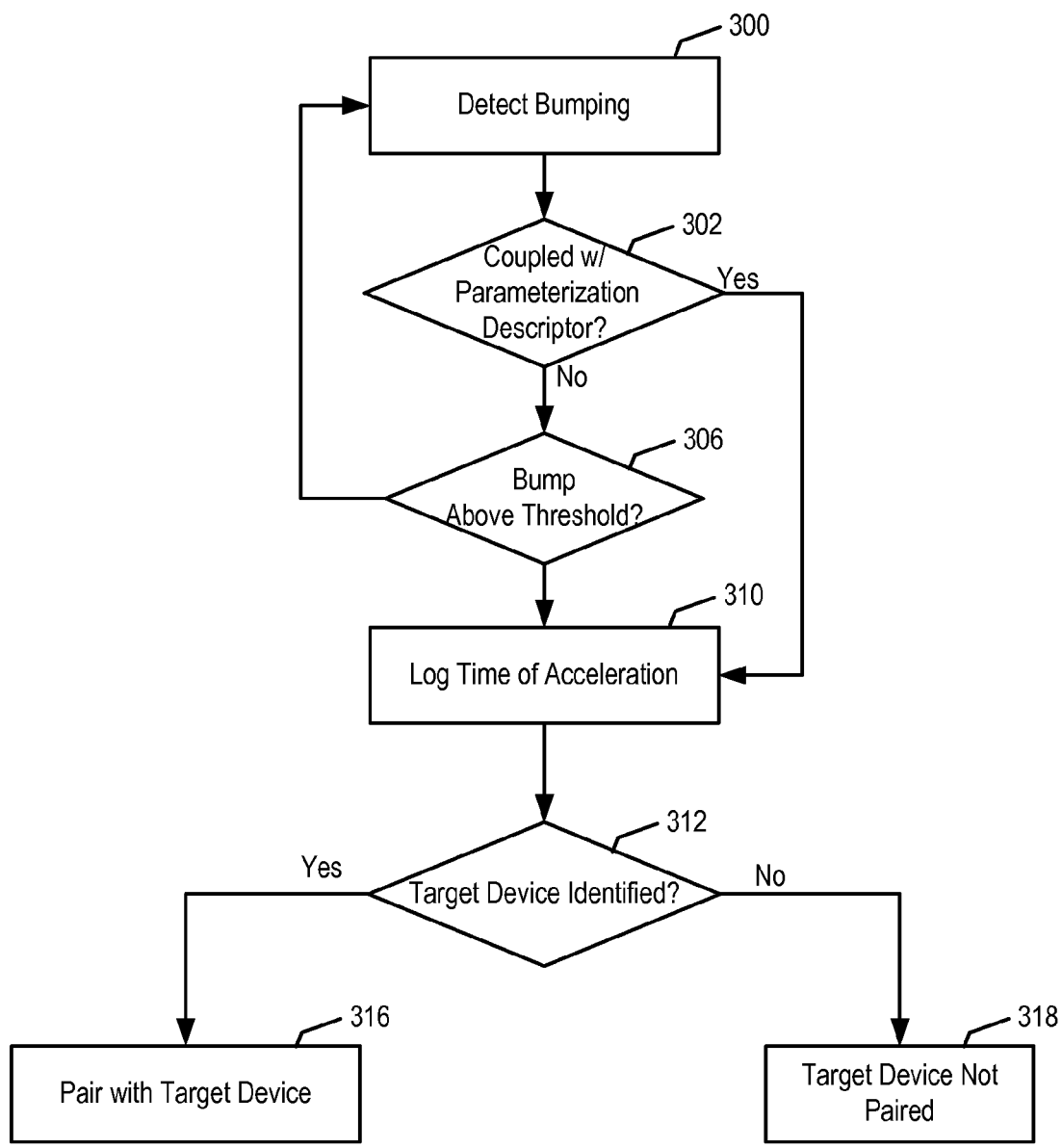
FIG. 3 is a flowchart for initiating a pairing operation by bumping technology.
Figure 4:
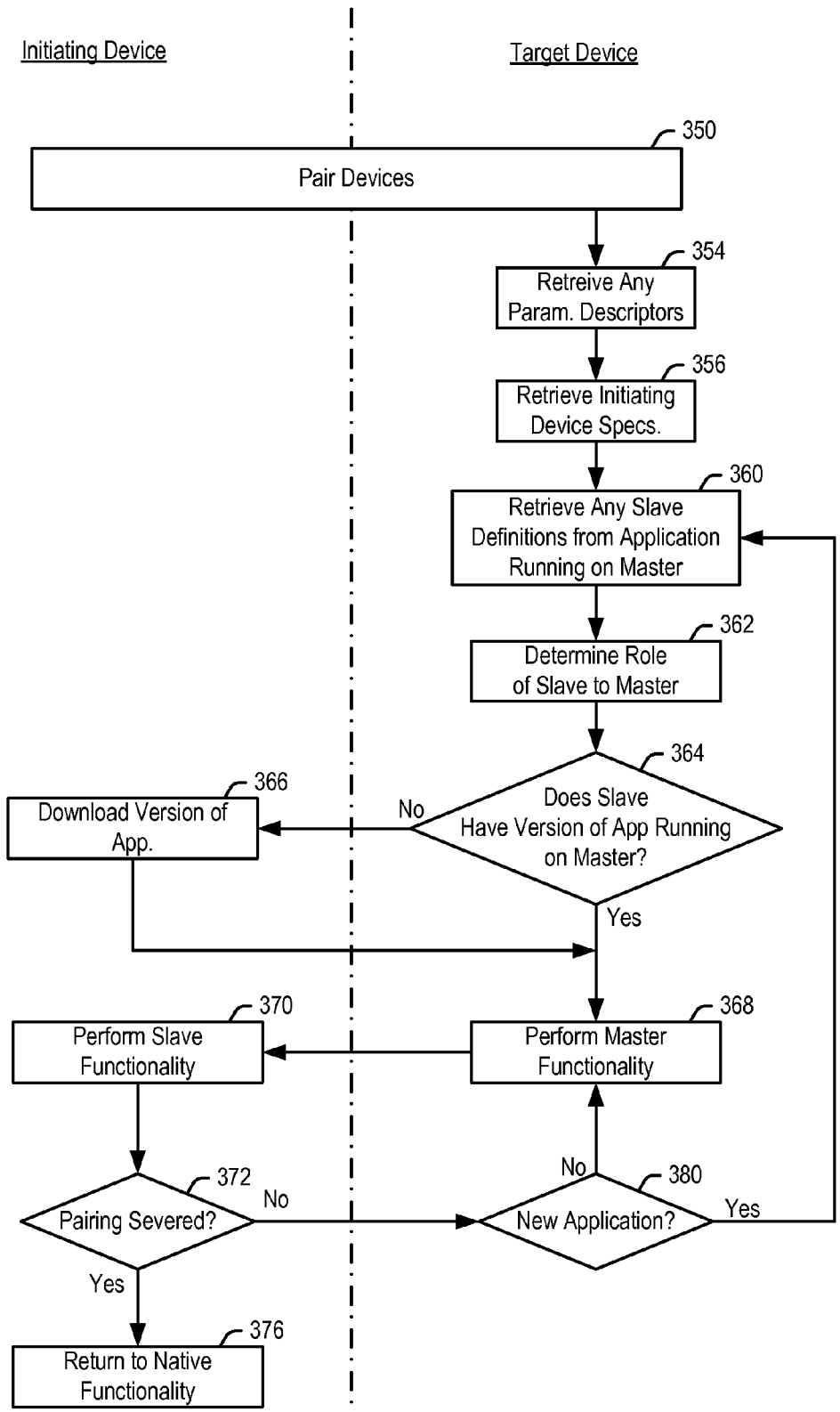
FIG. 4 is a flowchart for pairing devices in master-slave relationship.

FIGS. 2 and 3 relate to an embodiment where the pairing initiation act is a user bumping the initiating device 102*i* against a target device 102*t*. FIG. 2 shows an initiating device 102*i* and a target device 102*t*. In embodiments, the initiating device 102*i* may include a processor 140, a bump sensor 144, one or more communications interfaces 146, authentication components 148 and a data structure 149 for storing data including for example the device ID 150 and user ID 152. In further embodiments, the initiating device 102*i* may further store an encryption key for use in the authentication process. The target device may have the same or fewer components, such as for example as shown in the target device 102*t* of FIG. 2. The operation of these components is described below with further reference to the flowchart of FIG. 3.

In step 300, the bump sensor 144 in the initiating device 102*i* detects that it was bumped and relays this information to the processor 140. In embodiments, the bump sensor may be a MEMS accelerometer or a piezoelectric sensor capable of detecting vector acceleration along three orthogonal x, y and z axes. Bump sensor 144 may be other sensors in further embodiments capable of sensing scalar or vector characteristics of motion and/or acceleration.

In one embodiment, the pairing initiation act may do no more that indicate a desire to pair with the target device 102*t*. In further embodiments, the pairing initiation act may be performed in a particular way, or accompanied by a particular gesture which, in addition to indicating a desire to pair, indicates additional parameters to be applied to the pairing. These predefined manners and gestures of the initiating device are referred to herein as parameterization descriptors. As explained below, parameterization descriptors may be used to set a variety of parameters between the paired devices, including for example the role of the initiating device 102*i* in the operation of the target device 102*t*.

The parameterization descriptors may include a variety of acts and characteristics relating to how the pairing initiation act is performed by the initiating device 102*i*. In general, the parameterization descriptors may be categorized into three different groups. A first type of parameterization descriptor may be a gesture. These include, for example, the gesture(s) performed to initiate the pairing, as well as any predefined gestures which accompany these pairing initiation gesture(s).

As an example, a single bump of the initiating device 102*i* against the target device 102*t* may be performed to initiate pairing and represent a default parameterization descriptor. However, a user may instead perform multiple bumps, which may be interpreted as a gesture-type parameterization descriptor intended by the user to define some aspect of the relationship between the devices 102*i* and 102*t* once paired. Alternatively, a bump and then drag, i.e., an acceleration and then translation of the initiating device 102*i* in a linear or curvilinear path, may define a parameterization descriptor. The bump sensor, and possibly other motion sensors within the initiating device 102*i* are capable of sensing these motions of the initiating device 102*i*. Other gestures and detection methods may be included as parameterization descriptors in further embodiments.

As one further example, the initiating device 102*i* and/or target device 102*t* may include a touch-sensitive surface (touch screen). Where the touch screen is on the initiating device, a user may bump with the initiating device, then drag their finger or some other object (including the target device) across the touch screen in various motions or perform multiple taps on the touch screen. This motion/tapping is sensed by the touch screen and can be used to define one or more parameterization descriptors. Where the touch screen is on the target device, a user may bump the initiating device against the touch screen of the target device, then drag the initiating device or some other object across the touch screen in various motions or perform multiple taps on the touch screen. This motion/tapping is sensed by the touch screen and can be used to define one or more parameterization descriptors. In embodiments where a user additionally enters an authentication token, it is known to outfit a touch screen with a fingerprint sensor. In addition to the above regarding parameterization descriptors, the touch screen may further be used to authenticate the user in such embodiments.

A second type of parameterization descriptor may be the orientation of the initiating device 102*i* during the pairing initiation act. For example, where a 3-axes bump sensor 144 is used, different orientations of the device during the pairing initiation act may indicate a user's desire to set different parameters on the pairing. For example, where the initiating device is a mobile telephone, bumping the front, top or edge of the phone may each signify a different parameterization descriptor with a different set of parameters to be applied to the pairing.

As a further example, a tablet may be used as a display and/or an input device. If the pairing initiation act is performed with a tablet, and the tablet performs the pairing act with the tablet screen in a generally horizontal plane, this orientation may be interpreted as the user wishing to pair the tablet as an input device to the target device. On the other hand, if the tablet performs pairing initiation act with the tablet screen in a generally vertical plane, this orientation may be interpreted as the user wishing to pair the tablet as a display device to the target device. Other computing devices in other orientations are contemplated.

A third type of parameterization descriptor may be the relation of the initiating device 102*i* to the target device 102*t* during the pairing initiation act. For example, the initiation device 102*i* may be brought down on top of the target device, from the front, from the side, from a corner, etc. Each one of these different relations may signify a different parameterization descriptor.

In embodiments, each parameterization descriptor may be used to set a different parameter with regard to the pairing of the initiating device to the target device. As an example, a given parameterization descriptor may indicate whether the initiating device is going to be the master or the slave when the devices 102*i*, 102*t* are paired. For example, a single bump may be the default indicating that the initiating device 102*i* is to be the slave, but multiple bumps may override the default and indicate that the initiating device 102*i* is to be the master.

Parameterization descriptors may also define what function the slave is to perform in the paired relationship. As explained below, the slave may perform a variety of functions in the paired devices, including for example acting as a display, controller, input/output (I/O) device, storage location, computational device or some customized function for the master device. The parameterization descriptor may define which of these functions the user wants the slave to provide.

In further examples, parameterization descriptors may set parameters relating to the type of connection to be made (peer-to-peer or via an intermediary server through the network 108) and/or the duration of the connection. A wide variety of other parameters may be set in this fashion. These parameterization descriptors would be predefined, associated with a specific parameter and the parameterization descriptor and associated parameter would then be stored in the initiating device 102*i*, the target device 102*t* and/or the service 104.

In step 302, the initiating device 102*i* may determine whether any parameterization descriptors were performed. If so, the bump, coupled with the identified parameterization descriptor, is sufficient for the processor 140 to infer a desire to pair with a target device, and the pairing process continues with step 310 explained below.

If no parameterization descriptor is detected in step 302, the processor may next determine whether the detected bump was above a threshold acceleration in step 306 (a bump would in fact be a deceleration, or negative acceleration). The threshold is employed as a practicality, as some computing devices 102 such as mobile telephones will frequently be jostled. The threshold acceleration is therefore set above a baseline that the initiating device 102*i* would normally experience from unintended jostling. In embodiments, the step 306 may be omitted.

If acceleration above the threshold is detected in step 306, then a time when the bump occurred may be logged in step 310 for the initiating device 102*i*. For example, a timestamp can be created by a timer within the initiating device 102*i*. Assuming the target device 102*t* was bumped, the target device 102*t* may similarly generate a timestamp when it is bumped.

In step 312, the system determines whether a target device 102*t* has been identified. This may be done any of a number of ways. In one example, a pairing request is sent from the initiating device via communications interface 146 to any target devices within range to see if any such devices logged a bump at the same time or substantially the same time. The pairing request, as well as communication between devices 102*i* and 102*t* once paired, may be transmitted using technologies promulgated by groups such as the Bluetooth Special Interest Group, the Infrared Data Association (IRDA), and the Near Field Communication Forum (NFC), the specifications of which groups are hereby incorporated by reference in their entirety. Communications may further take place via radiofrequency. Other direct peer-to-peer communications are contemplated. Where the initiating and/or target device is a mobile telephone, the direct communication may be performed via Short Message Service (SMS) protocols or the like. Some or all of the pairing negotiation steps may alternatively or additionally be performed through an intermediary, such as for example the service 104 via the network 108.

The information from the bump sensor 144 in a bumped target device 102*t* may also be used in step 312 to identify the target device. If a computing device is indentified having a substantially equal and opposite bump, it may be inferred that this was the target device that was bumped. Aspects of the present technology also make use of the absolute or relative positions of initiating and target devices 102*i*, 102*t*. Absolute and relative positions may be determined by a variety of known technologies, including for example GPS receivers within the devices 102*i*, 102*t*.

If step 312 identifies a target device 102*t* bumped by the initiating device 102*i*, the devices may be paired in step 316. If no target device responds or is found, no pairing occurs in step 318. The initiating device may then repeat the pairing initiation act.

FIG. 3 shows a specific embodiment where pairing is initiated by a user bumping the initiating device 102*i* against a specific target device 102*t*. However, the pairing initiation act may be a wide variety of other acts and/or operations in further embodiments. Examples of these embodiments are described in co-pending U.S. patent application Ser. No. 12/820,981, by Bathiche et al., entitled "Networked Device Authentication, Pairing And Resource Sharing,", which application is incorporated by reference herein in its entirety. The present technology may also employ authentication protocols before allowing devices 102*i* and 102*t* to be paired. Such authentication protocols are also described in the this incorporated application.

Some examples of pairing initiation acts do not require user interaction. For example, devices may pair based on context and location. In embodiments, devices may use known localization techniques to determine that they are in a in a certain room. Given their co-location in the room, the devices have identified each other (for example by direct communications), and they may then pair or at least be ready to engage in a pairing. This occurs without user interaction in initiating the pairing. The pairing is based on the context, i.e., that the devices were both located in the same room. Then, when it comes to a pairing action, the devices have already identified each other, and an application on one or both devices can identify the two devices in the room and determine these are the devices to be paired, again, based on their context. Context may also indicate pairing in an example where for example the same application is launched simultaneously (or near simultaneously) on two devices.

In further embodiments, a pairing order may be set forth in a pairing population list. This is a device which may prepared in advance and sets forth a priority order with which devices pair. The devices indicated on the list are then made aware of the list and the priority of how and when they are to pair with other devices. The pairing list can be sorted in priority order given a number of different parameters, such as line of sight, location and proximity, frequency of pairing with said device, whether they are running the same application, similarity in social network, etc.

Devices should also be aware of their own location and orientation and see and recognize other devices in order to pair with them. In one example, a user may hold up a mobile phone and point it at the tv, possibly pressing a given button on the mobile device. The devices are able to determine a line of sight (an axis straight out from the mobile phone which intersects with the tv. The devices can thus interpret this as a desire to pair the devices and the devices can initiate the pairing operation. Device can "see" each other by using a number off techniques, such as a built in web camera, to do object detection. They can send round robin signals to each other by flashing beacon such as IR LEDs so that the camera or other IR photo-sensors can pick them up. In further embodiments, a camera on a device may be used to recognize a person, and then know to pair with his or her device if found.

Pairing can also be done by the user touching two device simultaneously. The device can either send a signal to each other using the body as an electrical conduit, or the devices "see" via computer vision that they are being touched. Consequently, the devices getting paired do not have be the ones doing the "seeing" of each other. In a further example, a third device may have a camera and is able to see both a first and second device (even if they cannot see each other). The third device can send information to the first and second devices letting them find each other and pair.

In embodiments of the present technology, once the initiating and target devices 102i, 102t are paired, one of the devices may operate as a slave and one as a master, with the slave performing as a peripheral device to the master. In embodiments, the default may be that the initiating device 102i is the slave and the target device 102t is the master. This may be reversed in further embodiments. This default may also be overridden, for example by a parameterization descriptor performed by the user of the initiating device 102i in set up the pairing. In the following description, the initiating device is treated as the slave, or peripheral, device. Where the target device 102t is the slave, the following description would be altered accordingly.

While embodiments described herein user the terms master and slave to refer to the roles of the initiating and target devices, it is understood that the roles of the initiating and target devices may be other than master and slave. Two computing devices can be paired, but have equal/alternating controlling roles within the session. Moreover, an application running can be residing across both devices, in essence like the same application is running on each device but the pairing provides collaborative benefits in that the paired devices are able to adapt and take advantage of other devices. In these situations, there is no clear master or slave. It is more like the devices work in coordinated manor to deliver the best possible experience to the user. The coordination between the two devices affords the user the right hardware interface paired with the right user interface to fulfill the user's desired task. For example, when authoring a document, a user may use one device keyboard to type, but then switch to my tablet display seamlessly to draw and insert an object. This may all occur in a coordinated manor that makes it look like there is only one application running between the two devices the whole time.

In general, when performing as a peripheral device, the initiating device 102i will take commands from the target device 102t, which sets the functionality of the initiating device based on a variety of factors. The operation of the initiating and target devices 102i, 102t in the paired relationship are now explained with reference to the flowchart of FIG. 4. In step 350, the devices 102i, 102t are paired as described above with respect to FIG. 3. In step 354, the target device retrieves any parameterization descriptors which were identified by the initiating and/or targeting devices. Any such descriptors identified by the initiating device 102i may be forwarded to the targeting device 102t, for example when the initiating device sends out the pairing request described above with respect to FIG. 3.

The specifications of the initiating device 102i may in part determine its functionality when performing as a peripheral device to the target device 102t. Such specifications may include characteristics and capabilities of the initiating device 102i. For example, a mobile telephone would be less likely to be used as a primary display, while a tablet may be more likely to be used as a primary display. Moreover, a particular initiating device may lack certain peripheral capabilities altogether. The initiating device 102i may forward its specifications to the target device 102t, for example when the initiating device sends out the pairing request. This information may alternatively or additionally come from the service 104 via the network 108. The target device 102t retrieves this information in step 356.

The application running on the target device may further define, at least in part, what role the initiating device will serve for the target device. For example, where a spreadsheet application is running on the target device 102t, it may be beneficial to have the initiating device function as a calculator. The application may have any number of other definitions of preferred functionality for the initiating device 102i. Any such definitions from the application are retrieved in step 360.

Based on any parameterization descriptors in step 354, the initiating device specifications in step 356 and any definitions from the application in step 360, the processor 140 of the target device 102t determines the role of the initiating device 102i in supporting the target device 102t in step 362. The processor 140 may apply various criteria in reaching the determination in step 362. In embodiments, the information from the various sources may be arbitrarily weighted, so that information from one source will factor more heavily in the determination of step 362. For example, the parameterization descriptors are performed by a user, and may indicate how the user would like the initiating device 102i to function. Thus, in embodiments, the parameterization descriptors may be given greater weight. On the other hand, if the specifications for the initiating device indicate that an initiating device is incapable of performing a given function, that factor may trump other considerations and weighted factors in the determination of step 362.

Given the disclosure herein, it is understood that a variety of predefined rules may be applied by the processor 140 of the target device in step 362 in order to determine the role of the initiating device 102i as a peripheral to the target device 102t.

In order to perform as a peripheral device, the initiating device 102i may need to have a version of an application that is running on the target device 102t. Accordingly, this check is made in step 364. If the initiating device 102i does not have a version of the application running on the target device 102t, the initiating device may download a version of the application in step 366. The initiating device may obtain a version of this application appropriate to the initiating device from the service 104 or other location. Instead of downloading and running a version of the application, the initiating device 102i may alternatively access and play a web version of the application. This may be available from the service 104 or other location via a browsing application on the initiating device 102i.

In step 368, the master performs its functionality. This may be any of a variety of operations that the target device 102t normally performs. Where the target device is a gaming console, it may perform various operating system functions, run gaming applications, instant messaging applications, media applications, etc. Where the target device is a personal computer, it may perform various operating system functions and run a browser and a variety of other applications. Where the target device is a mobile telephone, it may place telephone calls and run various email, text and other communications applications. The above description of the functionality of the target device 102t is by way of example only. The target device 102t may function in a wide variety of other known ways in further embodiments.

In step 370, based on the role determined in step 368, the initiating device 102i performs its functionality under the control of the target device 102t. In its role as a peripheral device to the target device 102t, the initiating device 102i may perform any of a wide variety of functions commonly performed by peripheral devices, and more. In one example, the initiating device may be controlled to operate as a display for the target device. It can be the primary display, a secondary display or a display in a dual display where a single image may be spread across, and moved between, multiple displays.

The initiating device 102i may function as a controller, such as for example a game controller. Various control functions may be assigned by the target device 102t to buttons, keys, mouse, etc. of the initiating device 102i so that the initiating device can be used for this purpose.

The initiating device 102i can function as an I/O device, where it is used to supply user input to the target device 102t and where it may receive text, image, video, sound, etc. to display or play back. The initiating device 102i may further function as a local back-up or storage device for the target device 102t.

Unlike many known peripherals, the initiating device 102i may be a smart device with significant computing power. As such, the initiating device 102i may be tasked by the target device 102t to perform certain computations and/or processing of data and information for the target device 102t.

The initiating device 102i may perform a wide variety of other tasks typically performed by peripheral devices. In addition, the initiating device 102i may perform roles that are customized for a given initiating device 102i. As one example, the target device may be running a map application. The initiating device may be a mobile phone, tablet or other mobile device so that a user may move the initiating device over the display of the target device. In so doing, a section of the map on the target device over which the initiating device is located may be enlarged and displayed on the initiating device display. In particular, the relative positions of the target and initiating devices is known. Therefore, the processor 140 in the initiating and/or target device can determine the position of the initiating device over the display of the target device. The target device can also relay to the initiating device what portion of the map is displayed at that position. Thus, running the same map application, the initiating device may display this same area, but larger. It is understood that the initiating device may be used in this manner to display a variety of visual enhancements, filters or alterations to a graphical image displayed on the target device.

In a further embodiment, the initiating device 102i may act as a camera, with an image captured by the initiating device displayed on the target device 102t (or visa-versa). Image processing could be done on either of the computing devices. In a further exemplary embodiment, a user may capture a photo, for example of a music band or their album art, on a first computing device with image capture, the image may be processed on the first and/or second computing device, and then the second computing device can initiate a query to put the option to play or buy the band's music on the second computing device.

The above roles of the initiating device 102i have been provided by way of example only. It is understood that the initiating device 102i may provide a wide variety of other functionality as a peripheral device to the target device.

In step 372, the initiating devices determines whether the pairing has been terminated. This may happen in several ways. A user may affirmatively terminate the connection. Alternatively, the user may move the initiating device out of range of the target device (or visa-versa). Further still, certain connection decay rules may be predefined which automatically sever a connection upon passage of some condition. For example, a user may specify that a pairing is only to last for a certain period of time, or that a connection is to terminate if there is an idle period of greater than a certain period of time. The pairing may be severed in step 372 other ways. If the pairing is severed in step 372, the initiating device may return to its native functionality in step 376.

Assuming the pairing is not severed in step 372, the target device 102t may check in step 380 whether a new or different application is running on the target device. As indicated above, the application running may affect the functionality of the initiating device as a peripheral to the target device. If a new application is found in step 380, the target device may return to step 360 to determine whether any slave definitions are provided in the new application. The role of the initiating device may then again be determined in step 362 and the process continues as described above. It is also noted that, even where an application on the target device does not change, the target device may periodically change the functionality of the initiating device to suit the needs of the target device.

The pairing of devices as described herein enables a variety of rich user experiences. As one example, a user may extend a gaming application across two computing devices. The user may start a gaming application on a first device, for example on his or her mobile telephone. The user may then come within range of a second user computing device. For example, the user may arrive home and the mobile computing device may pair with the user's console computing device. Thereafter, the console computing device may join the actual unique instance of the user's game, receiving the real time gaming state that the mobile device receives so that the console computing device is completely integrated into the gaming session as it is being played. Further details for sharing the same instance of a gaming experience are disclosed in the previously incorporated U.S. application Ser. No. 12/820,981.

In addition to sharing the same instance of the gaming experience, the paired devices may to share the I/O and interaction tasks with the gaming application. For example, the console computing device may display gaming information and the mobile device may be used as a game controller to input player moves, chat with friends or provide other information. It is understood that the computing devices may cooperate in other ways to provide rich user experience in the same gaming application. A first computing device may join an application running on a second computing device, or the computing devices may start up a shared experience in a single application session at the same time.

The cooperation of devices is not limited to gaming applications. The pairing of computing devices per the present technology enables a wide variety of other opportunities for a user extending an application across two or more paired devices, providing a variety of rich user experiences. As another experience, a user may pair two computing devices with large screens, such as for example a user's console and PC computing devices. Thereafter, the extended screen real estate may be used in a variety of ways, such as spreading the display for an application or media across the two computing device, or use a first computing device as a display for the application/media, and the second computing device to provide metadata about the user's experience on the first computing device. For example, the first computing device may be used to show a television program, and the second device may be used to display information about the television show, plot, actors, etc. Paired devices may cooperate in a wide variety of other ways to extend a user experience across the paired devices to provide a richer user experience.

In the embodiments described above, a user performed some affirmative pairing initiation act. However, the pairing initiation act may be performed automatically in further embodiments. In particular, an initiating device may periodically send out a pairing request for devices within range. Alternatively, knowing its position relative to other devices, an initiating device 102i may determine when another device is in range. If an initiating device receives a response to its pairing request, the initiating device 102i may automatically pair with the responding target device 102t. This pairing may result in a master-slave relationship as described above. It may additionally or alternatively result in the device interaction explained below.

It may not be desirable to allow automatic pairing of an initiating device 102i to a target device 102t. It is understood that the initiating and target devices in this instance may have had some prior pairing and/or have set permissions so that the pairing may automatically be established. Alternatively, a target device 102t may be prompted to pair upon contact from an initiating device 102i.

Figure 5:
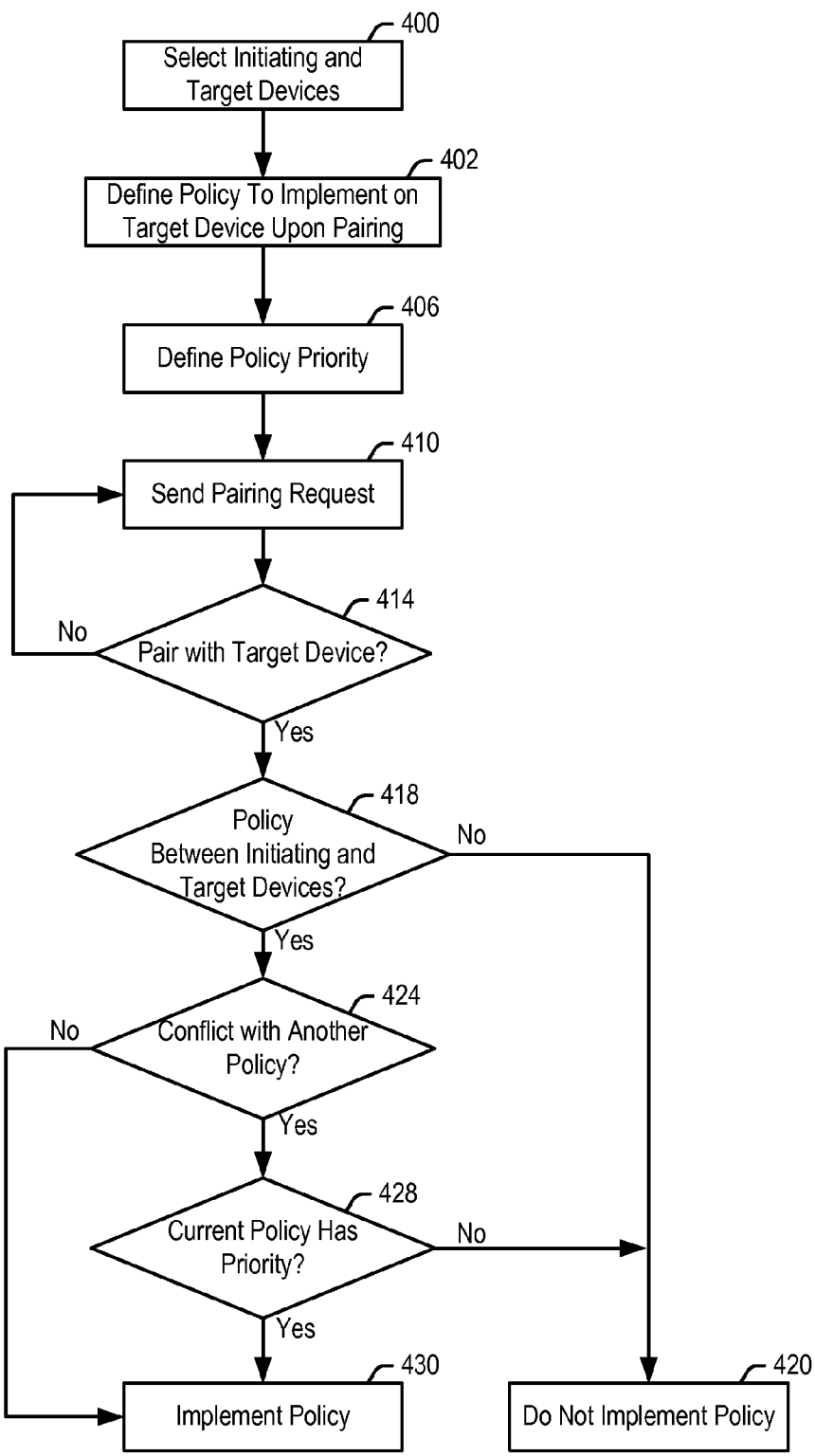
FIG. 5 is flowchart for setting and implementing personal profile policies between paired devices.

Automatic pairing allows an interaction between computing devices that may enhance a user experience with such devices. Paired devices may exchange and update information about a user and, based on a user's personal profile, may advantageously affect a user's interaction with various computing devices 102. FIG. 5 shows one embodiment where users set up a personal profile policy (PPP), which may be stored in the service 104 once created. This policy may be used to interact with various computing devices that a user may come into contact with on a regular basis (though it may also be used to set up policies for devices that it rarely comes into contact with, or comes into contact with for the first time, in further embodiments).

In steps 400-406, a user defines a PPP. In step 400, the user may select the initiating device 102i and the target device 102t to which the policy is going to apply. These devices may be identified in various ways including a device GUID, or some other name that the user has defined for the computing devices. In step 402, the user defines what the policy is going to do upon pairing of the initiating and target devices selected in step 400. Once steps 400 and 402 are completed, the user has now set up a general framework that whenever these two devices pair, some policy is going to be implemented on the initiating device and/or the target device. Further details relating to such as system are disclosed in U.S. patent application Ser. No. 12/820,981, entitled "Virtual HDMI Cable,"which application is incorporated by reference herein in its entirety.

It may happen that a given computing device is the subject of two or more conflicting policies. Therefore, in step 406, the user may further define a policy priority for resolving conflicts. When setting up the policy in step 402, the user may receive an indication of other policies that are also in place (possibly by others) that affect the devices selected by the user for a new policy. The user may then be given the opportunity to rank the policy the user is setting up relative to those other policies.

Steps 400-406 may be performed from any computing device 102. Once created, the policy may be stored on service 104 as noted above so as to be accessible to all of the user's computing devices.

As a user goes about their day, generally with one or more computing devices 102 such as a mobile telephone on their person, the user may come into contact (within range) of another computing device 102. At that point, the devices 102 may automatically pair as described above and as shown in steps 410 and 414. Either computing device 102 may act as the initiating device 102i. In embodiments, the computing device which is to be the initiating device 102i may be set by the user.

In step 418, the devices 102i and/or 102t may check whether there is a PPP set up between these devices. The devices 102i, 102t may receive this information from service 104. If not, no policy is implemented (step 420). If a policy is identified, the devices 102i and/or 102t may next check whether implementing the identified policy would be in conflict with another policy that is then being implemented on the device 102i and/or 102t. If no such conflict exists, the policy may be implemented in step 430 on the device 102i and/or 102t.

If a conflict is found in step 424, the device 102i and/or 102t may determine in step 428 which policy has priority. If the policy identified in step 418 has priority, then the policy is implemented over the previously implemented policy in step 430. If the policy identified in step 418 does not have priority, then the policy is not implemented (step 420).

Given the above, a wide variety of policies may be envisioned. In one example, a mother Alice may have a first child Bill and a second child Cathy. The mother watches all manner of programming on her television, and has set up a policy that when her mobile phone pairs with her set top box, tune the television to some predetermined media feed. Bill watches only PG-rated television content. He has a policy between his mobile phone and the set top box that when his mobile phone pairs with the set top box, content from a PG-rated feed is shown. Cathy watches only G-rated content. She has a policy between her mobile phone and the set top box that when her mobile phone pairs with the set top box, content from a G-rated feed is shown. The priorities are set so that Bill's policy in this example has priority over Alice's, and Cathy's has priority over both Bill's and Alice's.

In operation, Alice may be watching television. Bill walks into the room (with his mobile phone). The feed changes to PG-rated content per his policy. Then Cathy walks into the room (with her mobile phone). The feed again changes to G-rated content per her policy. If Cathy and Bill later leave, Alice's policy may again be implemented and the feed changes back to her original content.

The above is one of a wide variety of situations in which paired devices may interact with each other to set and implement policy to enhance a user experience with their computing devices. Policies may be set to send calendar and other reminders (remind Alice that Bill has a paper due when their mobile devices pair; remind Alice that her friend's birthday is coming up when their devices pair). Policies may be set to affect game play between players, such as for example varying the difficulty for one player (so that when Bill and Cathy play a game via a game console, the game is harder for Bill). A wide variety of other polices are envisioned.

Figure 6:
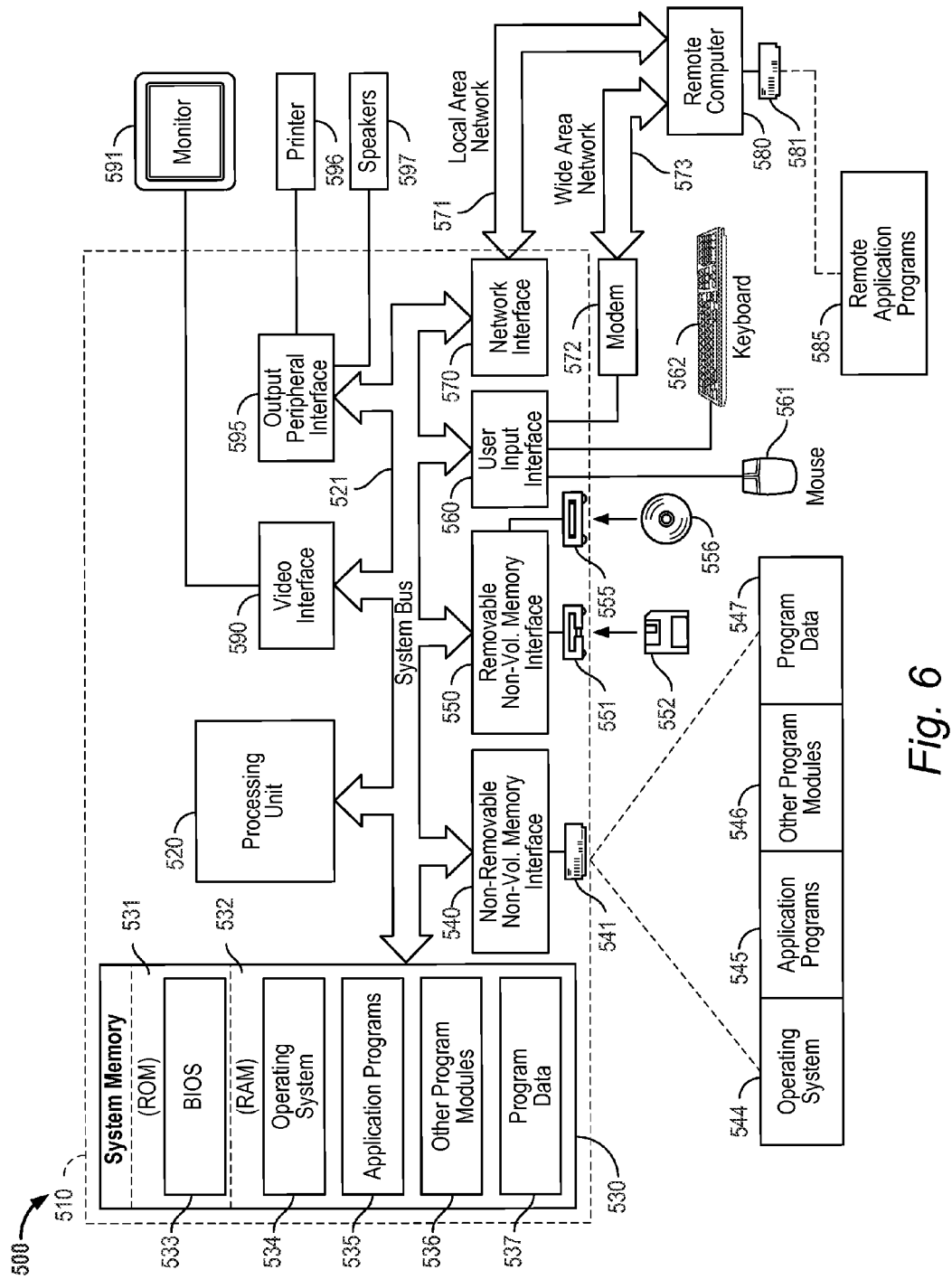
FIG. 6 is an example embodiment of a computing environment that may be used as an initiating or target computing device.

FIG. 6 illustrates an example of a suitable general computing system environment 500 that may comprise for example the desktop or laptop computing device 102-2. The computing system environment 500 is only one example of a suitable computing environment and is not intended to suggest any limitation as to the scope of use or functionality of the inventive system. Neither should the computing system environment 500 be interpreted as having any dependency or requirement relating to any one or combination of components illustrated in the exemplary computing system environment 500.

The inventive system is operational with numerous other general purpose or special purpose computing systems, environments or configurations. Examples of well known computing systems, environments and/or configurations that may be suitable for use with the present system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 6, an exemplary system for implementing the present technology includes a general purpose computing device in the form of a computer 510. Components of computer 510 may include, but are not limited to, a processing unit 520, a system memory 530, and a system bus 521 that couples various system components including the system memory to the processing unit 520. The processing unit 520 may for example be the processors 140 discussed above. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 may include a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 530 includes computer storage media in the form of volatile and/or nonvolatile memory such as ROM 531 and RAM 532. A basic input/output system (BIOS) 533, containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 6 illustrates operating system 534, application programs 535, other program modules 536, and program data 537.

The computer 510 may also include other removable/non-removable, volatile/nonvolatile computer storage media. By way of example only, FIG. 6 illustrates a hard disc drive 541 that reads from or writes to non-removable, nonvolatile magnetic media and a magnetic disc drive 551 that reads from or writes to a removable, nonvolatile magnetic disc 552. Computer 510 may further include an optical media reading device 555 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 541 is typically connected to the system bus 521 through a non-removable memory interface such as interface 540, magnetic disc drive 551 and optical media reading device 555 are typically connected to the system bus 521 by a removable memory interface, such as interface 550.

The drives and their associated computer storage media discussed above and illustrated in FIG. 6, provide storage of computer readable instructions, data structures, program modules and other data for the computer 510. In FIG. 6, for example, hard disc drive 541 is illustrated as storing operating system 544, application programs 545, other program modules 546, and program data 547. These components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and a pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus 521, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 6. The logical connections depicted in FIG. 6 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. This may be the same as communications interface 146 described above. When used in a WAN networking environment, the computer 510 typically includes a modem 572 or other means for establishing communication over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 6 illustrates remote application programs 585 as residing on memory device 581. It will be appreciated that the network connections shown are exemplary and other means of establishing a communication link between the computers may be used.

Figure 7:
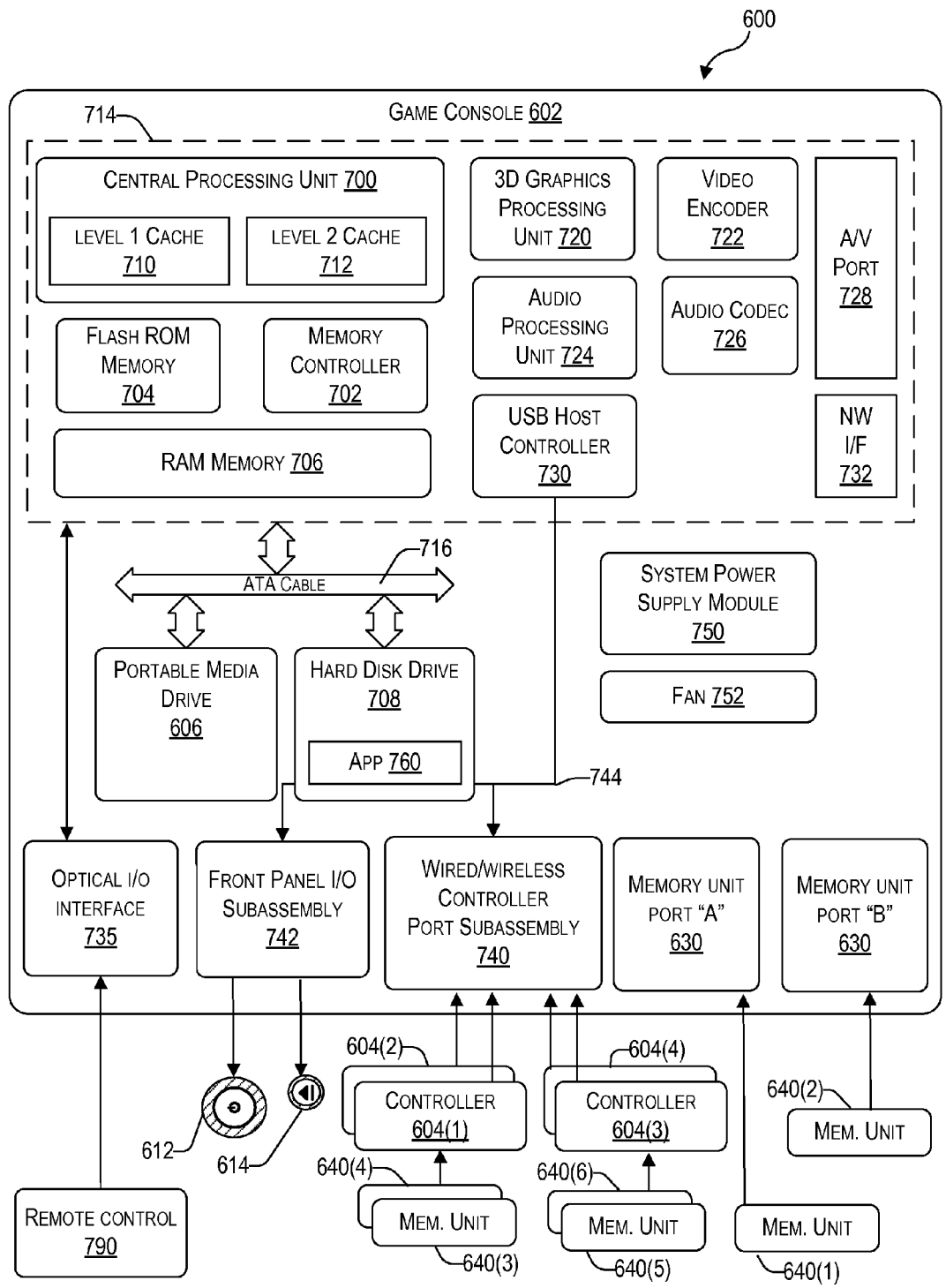
FIG. 7 is a further example embodiment of a computing environment that may be used as an initiating or target computing device.

FIG. 7 is a functional block diagram of gaming and media system 600, and shows functional components of gaming and media system 600 in more detail. System 600 may be the same as the computing device 102-3 described above. Console 602 has a central processing unit (CPU) 700, and a memory controller 702 that facilitates processor access to various types of memory, including a flash Read Only Memory (ROM) 704, a Random Access Memory (RAM) 706, a hard disk drive 708, and portable media drive 606. The processor 140 described above may be an example of CPU 700. In one implementation, CPU 700 includes a level 1 cache 710 and a level 2 cache 712, to temporarily store data and hence reduce the number of memory access cycles made to the hard drive 708, thereby improving processing speed and throughput.

CPU 700, memory controller 702, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 700, memory controller 702, ROM 704, and RAM 706 are integrated onto a common module 714. In this implementation, ROM 704 is configured as a flash ROM that is connected to memory controller 702 via a PCI bus and a ROM bus (neither of which are shown). RAM 706 is configured as multiple Double Data Rate Synchronous Dynamic RAM (DDR SDRAM) modules that are independently controlled by memory controller 702 via separate buses (not shown). Hard disk drive 708 and portable media drive 606 are shown connected to the memory controller 702 via the PCI bus and an AT Attachment (ATA) bus 716. However, in other implementations, dedicated data bus structures of different types can also be applied in the alternative.

A three-dimensional graphics processing unit 720 and a video encoder 722 form a video processing pipeline for high speed and high resolution (e.g., High Definition) graphics processing. Data are carried from graphics processing unit 720 to video encoder 722 via a digital video bus (not shown). An audio processing unit 724 and an audio codec (coder/decoder) 726 form a corresponding audio processing pipeline for multi-channel audio processing of various digital audio formats. Audio data are carried between audio processing unit 724 and audio codec 726 via a communication link (not shown). The video and audio processing pipelines output data to an A/V (audio/video) port 728 for transmission to a television or other display. In the illustrated implementation, video and audio processing components 720-728 are mounted on module 714.

FIG. 7 shows module 714 including a USB host controller 730 and a network interface 732. Communications interface 146 may be an example of network interface 732. USB host controller 730 is shown in communication with CPU 700 and memory controller 702 via a bus (e.g., PCI bus) and serves as host for peripheral controllers 604(1)-604(4). Network interface 732 provides access to a network (e.g., Internet, home network, etc.) and may be any of a wide variety of various wired or wireless interface components including an Ethernet card, a modem, a wireless access card, a Bluetooth module, a cable modem, and the like.

In the implementation depicted in FIG. 7, console 602 includes a controller support subassembly 740 for supporting four controllers 604(1)-604(4). The controller support subassembly 740 includes any hardware and software components needed to support wired and wireless operation with an external control device, such as for example, a media and game controller. A front panel I/O subassembly 742 supports the multiple functionalities of power button 612, the eject button 614, as well as any LEDs (light emitting diodes) or other indicators exposed on the outer surface of console 602. Subassemblies 740 and 742 are in communication with module 714 via one or more cable assemblies 744. In other implementations, console 602 can include additional controller subassemblies. The illustrated implementation also shows an optical I/O interface 735 that is configured to send and receive signals that can be communicated to module 714.

MUs 640(1) and 640(2) are illustrated as being connectable to MU ports "A" 630(1) and "B" 630(2) respectively. Additional MUs (e.g., MUs 640(3)-640(6)) are illustrated as being connectable to controllers 604(1) and 604(3), i.e., two MUs for each controller. Controllers 604(2) and 604(4) can also be configured to receive MUs (not shown). Each MU 640 offers additional storage on which games, game parameters, and other data may be stored. In some implementations, the other data can include any of a digital game component, an executable gaming application, an instruction set for expanding a gaming application, and a media file. When inserted into console 602 or a controller, MU 640 can be accessed by memory controller 702.

A system power supply module 750 provides power to the components of gaming and media system 600. A fan 752 cools the circuitry within console 602.

An application 760 comprising machine instructions is stored on hard disk drive 708. When console 602 is powered on, various portions of application 760 are loaded into RAM 706, and/or caches 710 and 712, for execution on CPU 700, wherein application 760 is one such example. Various applications can be stored on hard disk drive 708 for execution on CPU 700.

Gaming and media system 600 may be operated as a standalone system by simply connecting the system to monitor 614 (FIG. 1), a television, a video projector, or other display device. In this standalone mode, gaming and media system 600 enables one or more players to play games, or enjoy digital media, e.g., by watching movies, or listening to music. However, with the integration of broadband connectivity made available through network interface 732, gaming and media system 600 may further be operated as a participant in a larger network gaming community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A method of a first computing device interacting with a second computing device, comprising:
   a) receiving an indication that a user desires to pair the first computing device with the second computing device; and
   b) pairing the first and second computing devices, with the first computing device operating as peripheral device for the second computing device such that the first device performs as one of a display, a game controller, an input device, a storage device and a computational device for the second computing device under the control of the second computing device, where the functionality of the first computing device as a peripheral device are determined by factors including at least one of:
      b1) parameters set by a user upon pairing the first computing device with the second computing device;
      b2) specifications of the characteristics and capabilities of the first computing device, and
      b3) an application running on the second computing device upon receipt of the indication in said step a).

2. The method of claim 1, said step b1) comprising a gesture performed in conjunction with receipt of the indication that a user desires to pair the first computing device with the second computing device.

3. The method of claim 2, the first computing device including a touch-sensitive screen for input of information, said step b1) comprising a gesture performed by contact with the touch-sensitive screen on the first computing device in conjunction with receipt of the indication that a user desires to pair the first computing device with the second computing device.

4. The method of claim 3, wherein the receipt of the indication that a user desires to pair the first computing device with the second computing device comprises simultaneous contact with a screen or button on the second computing device.

5. The method of claim 1, said step b1) comprising an orientation of the first computing device to the second computing device upon receipt of the indication that a user desires to pair the first computing device with the second computing device.

6. The method of claim 5, the first computing device including a display having a touch-sensitive screen, the display capable of displaying information and receiving input of information, said step b1) comprising an indication to use the display of the first computing device as a display device when display of the first computing device is vertically oriented with respect to the second computing device upon receipt of the indication that a user desires to pair the first computing device with the second computing device, and said step b1) comprising an indication to use the display of the first computing device as an input/output device when display of the first computing device is horizontally oriented with respect to the second computing device upon receipt of the indication that a user desires to pair the first computing device with the second computing device.

7. The method of claim 1, said step b1) comprising a positional relation of the first computing device to the second computing device upon receipt of the indication that a user desires to pair the first computing device with the second computing device.

8. The method of claim 1, said step b) comprising the step of the second computing device evaluating the factors in b1), b2) and b3) according to a set of predefined rules and determining the functionality of the first computing device as a peripheral device based on the evaluation.

9. The method of claim 1, further comprising the step of changing the functionality of the first computing device as a peripheral device upon changing of an application running on the second computing device to a new application.

10. The method of claim 1, said step a) of receiving an indication that a user desires to pair the first computing device with the second computing device comprising the step of the user bumping the first computing device against the second computing device.

11. A method of a first computing device interacting with a second computing device, comprising:
    a) receiving an indication of a pairing initiation act between the first computing device and the second computing device;
    b) receiving an indication of one or more parameterization descriptors in conjunction with receiving the indication of said step a), the indication of the one or more parameterization descriptors indicating one or more parameters to be set for the pairing of the first and second computing devices, and wherein the one or more parameterization descriptors including at least one of:
       a gesture performed in association with receiving the indication in said step a);
       an orientation of one of the first and second computing devices upon receiving the indication of said step a); and
       a relative position of the first and second computing devices upon receiving the indication of said step a);
    c) pairing the first and second computing devices together; and
    d) applying to the pairing one or more of the parameters indicated by the one or more parameterization descriptors of said step b), the one or more parameters setting the first device to be a slave to the second device.

12. The method of claim 11, the one or more parameterization descriptors indicating that the first computing device is to act as a peripheral device to the second computing device.

13. The method of claim 12, further comprising the step e) of configuring aspects of the pairing at least in part based on specifications of the first computing device including at least one of characteristics of the first computing device and capabilities of the first computing device.

14. The method of claim 12, further comprising the step f) of configuring aspects of the pairing at least in part based on specification of the first computing device including at least one of characteristics of the first computing device and capabilities of the first computing device.

* * * * *